Figure 1:
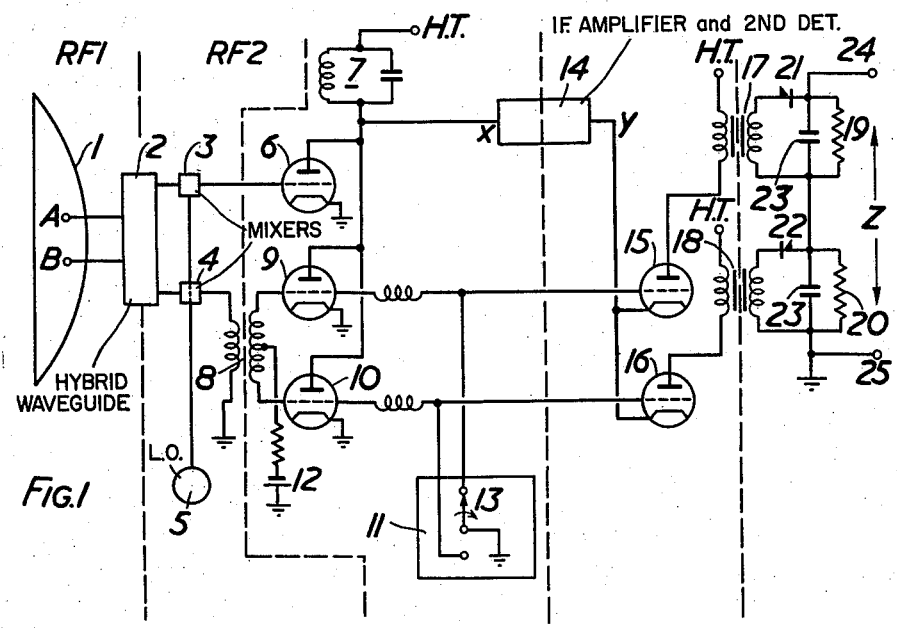

Sept. 17, 1963 L. J. WARD 3,104,389
MONOPULSE RADAR RECEIVING SYSTEM
Filed Aug. 16, 1954 2 Sheets-Sheet 1

INVENTOR
LESLIE JOSEPH WARD

BY Stevens, Davis, Miller
& Mosher
ATTORNEYS

Sept. 17, 1963          L. J. WARD          3,104,389

MONOPULSE RADAR RECEIVING SYSTEM

Filed Aug. 16, 1954          2 Sheets-Sheet 2

INVENTOR
LESLIE JOSEPH WARD
BY Stevens, Davis, Miller & Mosher
ATTORNEYS

United States Patent Office 3,104,389
Patented Sept. 17, 1963

3,104,389
MONOPULSE RADAR RECEIVING SYSTEM
Leslie Joseph Ward, Letchworth, England, assignor to The English Electric Company Limited, London, England, a British company
Filed Aug. 16, 1954, Ser. No. 449,920
Claims priority, application Great Britain Aug. 25, 1953
5 Claims. (Cl. 343—16)

This invention relates to radar receiving systems and apparatus therefor.

In auto-follow radar systems it is usual to compare characteristics of a signal received by a receiver from a target at two instants of time to obtain information as to the bearing of the target. This is done, for example, in the case of the so-called conical scan system. This system, however, has a limitation that the speed of scanning, being derived mechanically, is limited by practical considerations. In fact it is usual to scan at about 50 cycles per second. Such a scanning speed may impose limitations on the system. For example if fading occurs at a periodicity of this order, spurious information can be obtained.

According to the invention, a radar receiving system includes means for receiving a signal from a target in two channels in such a way that a difference in a characteristic of the signals in the two channels represents the bearing of the target with respect to the system, means for converting the signal in one channel to a further signal proportional to the sum of the received signals and for converting the signal in the other channel to a further signal proportional to the difference between said received signals, means for converting said further signals to a lower frequency, means for subsequently adding cyclically to the further signal from one of said channels the further signal from the other channel in a positive and in a negative sense respectively, a common amplifier for the resulting signals at said lower frequency, and means for separating the signals after amplification. It will usually be preferable for the sum of and the difference between the further signals to be produced before the frequency changing stage since at the frequencies normally received in the initial stages of a radar receiver this may be conveniently effected by means of a hybrid wave guide system.

The cyclic adding and subtracting of signals is preferably effected by electronic switching and in this case the mechanical limitations inherent in the conical scan system are removed and the scanning speed may be increased to many times that hitherto possible. At the same time, however, it is also possible by the present invention to make use of a common intermediate frequency amplifier so that errors introduced in this amplifier will be the same for both sets of signals.

The invention thus stated in broad terms is capable of providing bearing information in one plane. In the case of an auto-follow radar system required to operate in space, additional information is necessary. This may be provided according to the invention by arranging two further channels with their axis at an angle to that of the first two to obtain the necessary additional information.

The system is suitable for pulse or C.W. operation. The characteristic of the respective signals which is used to obtain bearing information may be, for example, a difference in amplitude or a difference in phase.

Figure 1A:
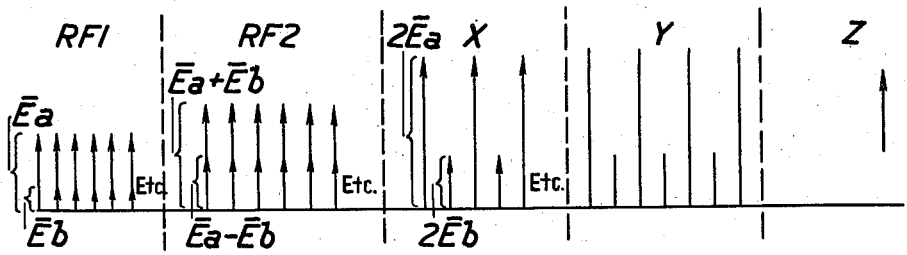
Figure 1B:
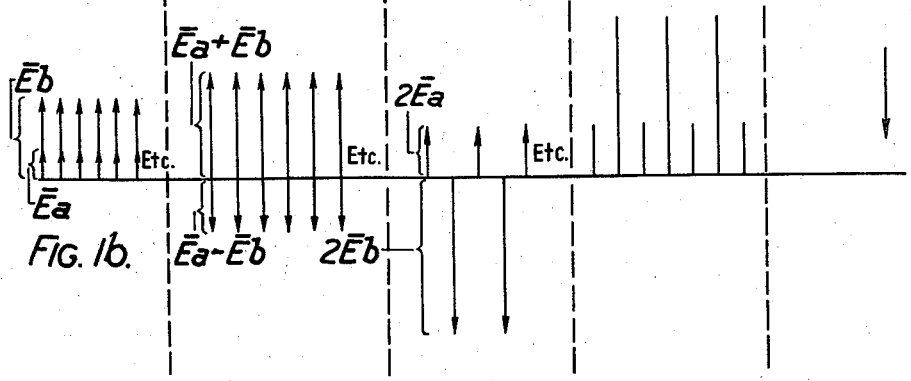
Figure 2:
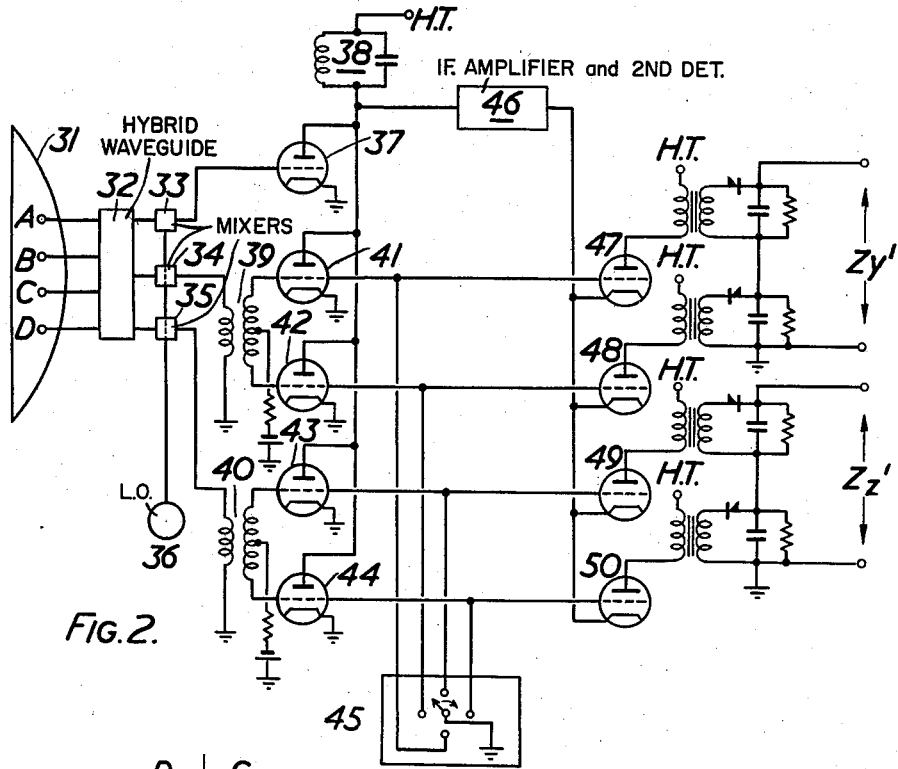
Figure 3:
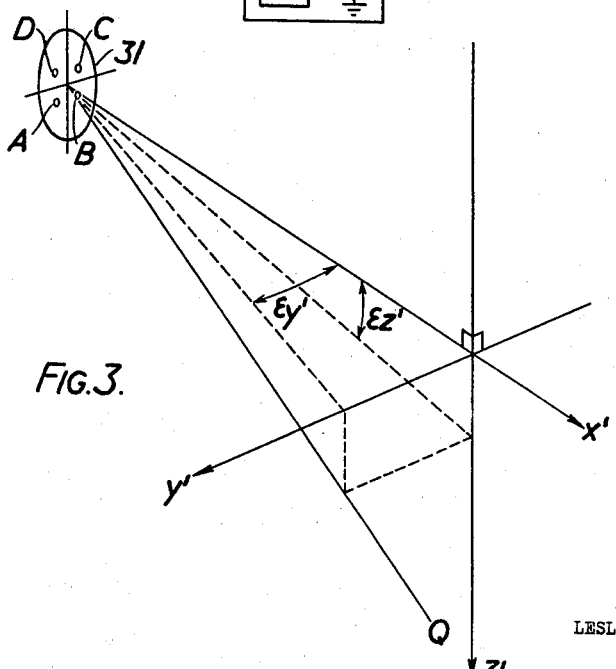

In order that the invention may be fully understood, its application to an auto-follow radar system will be described with reference to the accompanying drawings in which:

FIG. 1 is a simplified circuit diagram of one pair of channels for receiving pulse signals from a target and converting them into bearing information in a single plane, FIG. 1a is a diagram of the signal voltages in the various parts of the circuit of FIG. 1 neglecting the phase differences and assuming that the target is off-set from the reflector axis in one direction in the plane of the paper, FIG. 1b is a corresponding diagram assuming that the target is off-set from the reflector axis in the same plane but in the opposite direction, FIG. 2 is a simplified circuit diagram of a radar receiving system for operation in two planes and FIG. 3 is a diagram showing the attitude of the receiving antennae of FIG. 2 with respect to the line of sight.

Pulsed operation is assumed.

In FIG. 1 a parabolic reflector 1 is provided with a pair of wave guide feeds A and B, the ends of which are located one on each side of the focal point of the reflector. It can be arranged that the difference in amplitude of signals received at the ends of the feeds A and B from a distance source varies approximately linearly with the angle between the reflector axis and the line of sight provided the angle is small. Thus polar diagrams of signal strength for the feeds A and B would be in the form of two lobes intersecting on the reflector axis. The signals received at A and B are fed to a hybrid wave guide system 2 which has the effect of producing at its two output terminals the sum and the difference respectively of the original signals. (Such a waveguide system is disclosed in U.S. Patent 2,682,656.) These sum and difference signals are fed to mixer units 3 and 4 to produce outputs at an intermediate frequency. The units 3 and 4 are fed from a single local oscillator 5. The intermediate frequency output of the mixer 3 representing the sum of the received signals is fed directly to the grid of a valve 6 which is supplied through an anode load circuit 7 from a high tension supply and an amplified signal is obtained at the point in the circuit marked X. The intermediate frequency output of the mixer 4 is applied to the primary of a transformer 8 the secondary of which is connected in push-pull to the grids of two further valves 9 and 10 which are supplied through the same anode load circuit 7. Thus the valve 9 will add a signal corresponding to the output of the mixer 4 to the signal obtained from the valve 6 and the valve 10 will subtract a signal corresponding to the output of the mixer 4 from the signal obtained from the valve 6. The valves 9 and 10, however, are each controlled so as to conduct alternately. The method of achieving this result is shown diagrammatically by a switching unit 11 in which a source of potential represented as a battery 12 is switched alternately by a switch 13 first to the grid of the valve 9 and then to the grid of the valve 10. The valves 9 and 10 are by this means rendered conductive only when the source of potential 12 is connected to their respective grids. In practice, of course, the switching unit 11 would be arranged to function electronically and not mechanically but has been shown in the latter form for the sake of simplicity.

It will be appreciated that the combined outputs of the three valves 6, 9 and 10 at X will be in the form of a train of pulses consisting alternately of the sum of derived signals corresponding to the signals received at A and B plus the difference between such derived signals, and the sum of derived signals corresponding to the signals received at A and B minus the difference between such derived signals. This train of pulses is then passed through an intermediate frequency amplifier and second detector 14 and the output is applied to the cathodes of two further valves 15 and 16.

The grids of the valves 15 and 16 are controlled in the same manner as the grids of the valves 9 and 10 by the switching unit 11 so that they are rendered conductive alternately and in synchronism with the valves 9 and 10. The valves 15 and 16 are fed from H.T. supplies through separate anode load transformers 17 and 18 the secondaries of which are connected to load resistors 19 and 20 through rectifiers 21 and 22 respectively. The rectifiers 21 and 22 are oppositely directed. Each of the load resistors 19 and 20 is shunted by a capacitor 23 so that a D.C. output signal appears across each load resistor. The load resistors 19 and 20 are connected in series and are connected to output terminals 24 and 25.

Referring now to FIG. 1a which is divided into sections RF1, RF2, X, Y and Z corresponding to the similarly indicated portions of the circuit of FIG. 1, the signals received by the feeds A and B in section RF1 consist of a chain of pulses of which three are illustrated having amplitudes $\bar{E}_a$ at the feed A and $\bar{E}_b$ at the feed B assuming that the target is at a given angle to the axis of the reflector 1 in the plane of the paper. At the stage RF2, however, after passing through the hybrid wave guide system 2, the corresponding signals have amplitudes equal to the sum $|\bar{E}_a + \bar{E}_b|$ of the signals in the stage RF1 and the difference $|\bar{E}_a - \bar{E}_b|$ of the signal in the stage RF1. At the stage X in the circuit of FIG. 1, the signals of RF2, having been reduced to an intermediate frequency and subjected to the summing and differencing action of the valves 6, 9 and 10 under the influence of the switching unit 11, now have amplitudes as shown at X in FIG. 1a corresponding to $2\bar{E}_a$ and $2\bar{E}_b$ respectively it being assumed, in this particular case, that the switching unit 11 is operated at half the pulse repetition frequency. After passing the IF amplifier and the second detector 14, the signals at Y thus consist of a chain of pulses as shown. For the sake of convenience in illustration the gain of the IF amplifier and second detector has been assumed to be unity. The signals are then applied to the valves 15 and 16 which are switched alternately to energize the transformers 17 and 18 and to supply load resistors 19 and 20 through rectifiers 21 and 22. Due to the fact that the rectifiers 21 and 22 are oppositely directed, the algebraic sum of the D.C. voltages appearing across the resistors 19 and 20 will provide an error signal corresponding in direction and magnitude with the direction and angle of the target with respect to the axis of the reflector 1. This error signal may be used to apply a correction to the attitude of the system with respect to the target in the usual way.

FIG. 1b illustrates the conditions when the target is displaced from the axis of the reflector 1 in the opposite direction by the same amount. The signals at RF1 have amplitudes $\bar{E}_b$ and $\bar{E}_a$ as before but in this case $\bar{E}_b$ is larger than $\bar{E}_a$. At RF2 therefore where the sum and the difference is produced, $|\bar{E}_a + \bar{E}_b|$ will be positive and $|\bar{E}_a - \bar{E}_b|$ will be negative, that is to say, $|\bar{E}_a - \bar{E}_b|$ will be 180° out of phase relative to $|\bar{E}_a + \bar{E}_b|$. At X there will thus be a signal having a small amplitude in the positive sense, $2\bar{E}_a$, followed by a signal having a larger amplitude in the negative sense, $2\bar{E}_b$. At Y there will be a chain of pulses as before but the positions of the small and large amplitude pulses will be interchanged as compared with the conditions illustrated in FIG. 1a. The D.C. error signal Z appearing between the terminals 24 and 25 will thus be of the same magnitude as in the case illustrated in FIG. 1a but in the opposite direction.

Referring now to FIG. 2, a schematic arrangement is shown for operation in two planes. In this case a reflector 31 has four wave guide feeds A, B, C and D. These are shown for convenience of illustration of the circuit as being in line but in fact they would be arranged as shown in FIG. 3. In FIG. 3 the axis of the reflector is the line X′ and signals are required to determine the angular displacement of a target Q with respect to arbitrary ordinates y′ and z′. The wave guide feeds A, B, C and D are, as will be seen, arranged around the reflector axis x′, and the signals are required to be proportional to the angles $\epsilon y'$ and $\epsilon z'$.

Referring again to FIG. 2, these angles will be proportional to $|\bar{E}_a + \bar{E}_d| - |\bar{E}_b + \bar{E}_c|$ and $|\bar{E}_a + \bar{E}_b| - |\bar{E}_c + \bar{E}_d|$.

Thus, a chain of pulses is required, ultimately amplitude modulated in a pattern repeated every four pulses, in which each pair of adjacent pulses represents in amplitude the difference between the signals received by the wave guide feeds on one side of one of the ordinates y′ and z′ and those received by the wave guide feeds on the other side of the same ordinate.

The method used is similar to that illustrated in FIG. 1 but in this case a somewhat more complex hybrid system 32 is used which has three outputs which are fed into three mixer units 33, 34 and 35, all controlled by a common local oscillator 36. The signals fed to the mixer unit 33 are in the form $\bar{E}_a + \bar{E}_b + \bar{E}_c + \bar{E}_d$, the signals fed to the mixer unit 34 are in the form $|\bar{E}_a + \bar{E}_d| - |\bar{E}_b + \bar{E}_c|$ and the signals fed to the unit 35 are in the form $|\bar{E}_a + \bar{E}_b| - |\bar{E}_c + \bar{E}_d|$. The intermediate frequency output from the mixer 33 is fed to the grid of a valve 37 the anode of which is supplied from an H.T. line through an anode load circuit 38 and the outputs from the mixer units 34 and 35 are fed to transformers 39 and 40 respectively having push-pull secondaries as in the case of the transformer 8 in FIG. 1. The secondaries of the transformers 39 and 40 are connected to the grids of further valves 41, 42, 43 and 44, the anodes and cathodes of these valves being connected in parallel with those of the valve 37. A switching unit 45 is provided which applies a bias to the grids of the valves 41, 42, 43, 44, so as to render them conductive in turn in the same way as in the case of FIG. 1. The output of the valves 37, 41, 42, 43 and 44 is then applied to an intermediate frequency amplifier and second detector 46. It will be seen that due to the action of the transformer 39 a signal corresponding to the output of the mixer unit 34 will first be added to and then subtracted from a signal corresponding to the output from the mixer unit 33. Thus:

$|\bar{E}_a + \bar{E}_b + \bar{E}_c + \bar{E}_d| + \{|\bar{E}_a + \bar{E}_d| - |\bar{E}_b + \bar{E}_c|\} = |2\bar{E}_a + 2\bar{E}_d|$ and $|\bar{E}_a + \bar{E}_b + \bar{E}_c + \bar{E}_d| - \{|\bar{E}_a + \bar{E}_d| - |\bar{E}_b + \bar{E}_c|\} = |2\bar{E}_b + 2\bar{E}_c|$ Subsequently a similar action will take place due to the switching of the valves 43 and 44. Thus:

$|\bar{E}_a + \bar{E}_b + \bar{E}_c + \bar{E}_d| + \{|\bar{E}_a + \bar{E}_b| - |\bar{E}_c + \bar{E}_d|\} = |2\bar{E}_a + 2\bar{E}_b|$ and $|\bar{E}_a + \bar{E}_b + \bar{E}_c + \bar{E}_d| - \{|\bar{E}_a + \bar{E}_b| - |\bar{E}_c + \bar{E}_d|\} = |2\bar{E} + 2\bar{E}_d|$ The video output is simultaneously switched by valves 47, 48, 49 and 50 into output circuits grouped in pairs identical to the pair shown in FIG. 1. Thus two D.C. output signals $Z_y'$ and $Z_z'$ will be produced each corresponding in direction and magnitude to the displacement of the target with respect to the y′ and z′ axes respectively.

In the arrangements described the combinations of valves 6, 9 and 10 in FIG. 1, and 37, 41, 42, 43 and 44 in FIG. 2, function both as switching means and means for adding and subtracting signals. It will be apparent however that alternative arrangements could be used. For example the addition and subtraction could be carried out by means of hybrid transformers or equivalent devices, such as suitable wave guide or co-axial line structures, with the switching being effected separately by valves or other equivalent means.

What I claim as my invention and desire to secure by Letters Patent is:

1. A radar receiving system including means for receiving a signal from a target in two channels in such a way that a difference in a characteristic of the signals in the two channels represents the bearing of the target with respect to the system, means for converting the signals in two channels to a first signal proportional to the sum of the received signals and to a second signal proportional to the difference between said received signals, means for converting said first and second signals to a lower frequency, means for adding cyclically to the lower frequency signal derived from said first signal, the lower frequency signal derived from said second signal in a positive and in a negative sense respectively, a common amplifier for the resulting signals at said lower frequency, and means for separating from the output of said common amplifier two sets of signals respectively representative of each of said channel signals.

2. A radar receiving system according to claim 1, wherein said means for converting the received signals is a hybrid waveguide system.

3. A radar receiving system according to claim 1, wherein said means for cyclically adding the lower frequency signals includes an electronic switching circuit.

4. A radar receiving system according to claim 3, wherein said circuit comprises three valves with a common load, means for causing one of said valves to pass continuously one of said lower frequency signals, means for causing the other two valves to pass the other of said lower frequency signals in a positive and in a negative sense respectively and means for causing said other two valves to conduct alternately by grid switching under the control of an electronic switching device.

5. A radar receiving system according to claim 4, wherein said means for separating from the output of said common amplifier two sets of signals representative of each of said channel signals, comprise two further valves and means for causing them to conduct synchronously with said other two valves.

References Cited in the file of this patent
UNITED STATES PATENTS

| | | |
|---|---|---|
| 2,423,104 | Labin | July 1, 1947 |
| 2,456,666 | Agate et al. | Dec. 21, 1948 |
| 2,509,207 | Busignies | May 30, 1950 |
| 2,637,028 | McIlwain | Apr. 28, 1953 |
| 2,682,656 | Phillips | June 29, 1954 |
| 2,687,520 | Fox et al. | Aug. 24, 1954 |